United States Patent
Tompkins

(10) Patent No.: US 11,602,125 B2
(45) Date of Patent: Mar. 14, 2023

(54) PET FEEDING STATION WITH AROMA DISPENSING SYSTEM

(71) Applicant: Booker Tompkins, Orlando, FL (US)

(72) Inventor: Booker Tompkins, Orlando, FL (US)

(73) Assignee: Graceful Lion Creations LLC, Orlando, FL (US)

(*) Notice: Subject to any disclaimer, the term of this patent is extended or adjusted under 35 U.S.C. 154(b) by 156 days.

(21) Appl. No.: 16/825,669

(22) Filed: Mar. 20, 2020

(65) Prior Publication Data
US 2021/0289744 A1    Sep. 23, 2021

(51) Int. Cl.
*A01K 5/01* (2006.01)

(52) U.S. Cl.
CPC .................. *A01K 5/0114* (2013.01)

(58) Field of Classification Search
CPC ...... A01K 5/01; A01K 5/0107; A01K 5/0114; A01K 5/0128; A01K 5/0142
See application file for complete search history.

(56) References Cited

U.S. PATENT DOCUMENTS

| | | | | |
|---|---|---|---|---|
| 1,831,593 A | * | 11/1931 | Franka | A01K 5/0135 119/61.54 |
| 3,631,840 A | * | 1/1972 | McCormack | A01K 5/0291 119/51.12 |
| 5,005,524 A | * | 4/1991 | Berry | A01K 7/027 119/51.11 |
| 5,113,798 A | | 5/1992 | Rera | |
| D327,849 S | * | 7/1992 | Armstrong | D9/453 |
| 5,156,113 A | | 10/1992 | Sextro | |
| 5,345,063 A | | 9/1994 | Reusche et al. | |
| 6,314,911 B1 | * | 11/2001 | Kaytovich | A01K 5/0114 119/61.5 |
| 6,363,886 B1 | * | 4/2002 | Statton | A01K 39/014 119/51.5 |
| 6,786,177 B1 | * | 9/2004 | Lemkin | A01K 5/0114 119/51.01 |
| 7,856,944 B1 | | 12/2010 | Stauffer | |
| 8,397,674 B2 | | 3/2013 | Lipscomb et al. | |
| 9,410,695 B2 | | 8/2016 | Hsiao | |
| 9,545,081 B2 | | 1/2017 | Nolan | |
| D897,611 S | * | 9/2020 | Nixon | D30/133 |

(Continued)

FOREIGN PATENT DOCUMENTS

| | | | | |
|---|---|---|---|---|
| EP | 3578040 A1 | | 12/2019 | |
| GB | 2404559 A | * | 2/2005 | ........... A01K 5/0142 |

(Continued)

*Primary Examiner* — Ebony E Evans
(74) *Attorney, Agent, or Firm* — Jason T. Daniel, Esq.; Daniel Law Offices, P.A.

(57) ABSTRACT

A pet feeding system includes a generally hollow main body having openings along the top surface for receiving a food dish and a water dish. A fan is positioned along another opening in the bottom surface of the main body that is located in line with the food dish. A heating plate having a removable tray is positioned between the fan and the food dish. The tray is constructed from a heat conducting material and imparts heat from the heating plate onto a material. Aroma produced by the scented material is moved by the fan toward air vents in the food bowl, and a pair of locking rings secure the bowls to the main body to prevent a pet from accessing the scented material.

11 Claims, 7 Drawing Sheets

(56) References Cited

U.S. PATENT DOCUMENTS

| | | | |
|---|---|---|---|
| 2001/0045188 A1* | 11/2001 | Tsengas | A01K 7/00 |
| | | | 119/51.01 |
| 2005/0056226 A1 | 3/2005 | Ruggiero | |
| 2006/0032451 A1* | 2/2006 | Gonet | A01K 5/025 |
| | | | 119/61.5 |
| 2007/0227456 A1* | 10/2007 | Borey | A01K 7/027 |
| | | | 119/61.52 |
| 2008/0105205 A1 | 5/2008 | Goehring | |
| 2015/0053138 A1 | 2/2015 | Ramsey et al. | |
| 2015/0114301 A1* | 4/2015 | Nolan | A01K 5/0114 |
| | | | 119/61.5 |
| 2017/0127647 A1* | 5/2017 | Owens, III | A01K 5/0114 |
| 2018/0014504 A1* | 1/2018 | Grinnell | A01K 5/0114 |
| 2019/0133076 A1 | 5/2019 | Levy et al. | |

FOREIGN PATENT DOCUMENTS

| | | |
|---|---|---|
| GB | 2501740 A | 11/2013 |
| KR | 20200033158 A * | 3/2020 |

* cited by examiner

PET FEEDING STATION WITH AROMA DISPENSING SYSTEM

TECHNICAL FIELD

The present invention relates generally to pet feeding devices, and more particularly to a pet feeding station with an aroma dispensing system.

BACKGROUND

The statements in this section merely provide background information related to the present disclosure and may not constitute prior art.

Many households have at least one pet such as a dog or cat. Such animals may provide company, amusement, or personal security. However, owning a pet does involve a certain amount of responsibility. One obvious responsibility is providing the pet with proper nutrition which leads to a healthier and happier life for the animal.

One of the most popular forms of pet food is kibble, which is typically composed of various meats, meat byproducts, cereals, grains, vitamins, and minerals, that are dried and provided in bite sizes for easy consumption by a pet. This food is popular because it does not require much preparation, is easy to serve and has an extremely long shelf life.

It is well known that a canine's sense of smell is 40 times greater than that of a human. As such, pets use their sense of smell to identify food and particularly foods they like. Unfortunately, dry kibble has very little aroma, and does not tend to smell like any "natural" foods such as meat, for example. As such, it is not uncommon for a pet to become disinterested in the same dry kibble over time. In some cases, the pet will slowly begin to eat less and less, and may suffer harmful effects from malnutrition. As a result, many pet owners in this situation must switch to a different type of food such as wet formula or canned pet food for example. When this happens, the pet owners are not able to enjoy the convenience of dry kibble. Additionally, some animals have medical conditions that do not allow them to eat other types of food.

Accordingly, it would be beneficial to provide a pet feeding station having an aroma dispensing system that can introduce any number of appealing aromas onto kibble or other food within the dish, so as to provide a more enticing and pleasing experience for a pet, and to encourage the pet to eat the food contained within the dish.

SUMMARY OF THE INVENTION

The present invention is directed to a pet feeding system. One embodiment of the present invention can include a generally hollow main body having openings along the top surface for receiving a food dish and a water dish. A fan can be positioned along another opening in the bottom surface of the main body that is located in line with the food dish. A heating plate can be positioned between the fan and the food dish.

Another embodiment of the present invention can include a removable tray for receiving a scented material. The tray can be constructed from a heat conducting material and can impart heat from the heating plate onto the material. Aroma produced by the scented material can travel toward the food bowl and can be introduced into the bowl by a plurality of air vents.

In another embodiment, a pair of locking rings can secure the bowl to the main body and can prevent a pet from accessing the scented material.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
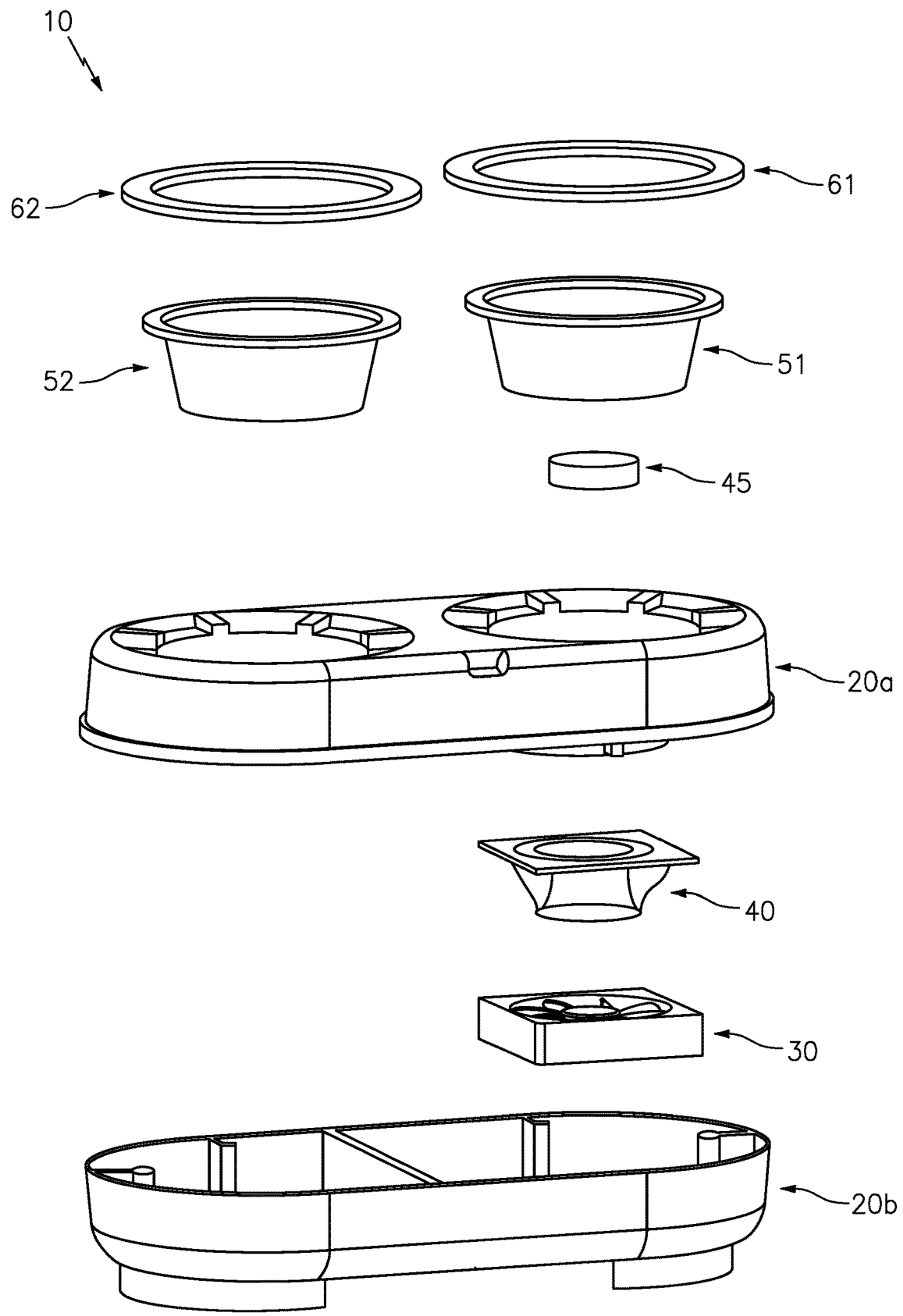
FIG. 1 is an exploded parts view of the pet feeding system, in accordance with one embodiment of the invention.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, the term "removably secured," and derivatives thereof shall be used to describe a situation wherein two or more objects are joined together in a non-permanent manner so as to allow the same objects to be repeatedly joined and separated.

As described throughout this document, the term "complementary shape," and "complementary dimension," shall be used to describe a shape and size of a component that is identical to, or substantially identical to the shape and size of another identified component within a tolerance such as, for example, manufacturing tolerances, measurement tolerances or the like.

FIGS. 1-7 illustrate one embodiment of a pet feeding station with aroma dispensing system 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

FIG. 1 is an exploded parts view of one exemplary embodiment of the pet feeding system. As shown, the system 10 can include main body segments 20a-20b for housing a fan 30, a heating plate 40, a removable tray 45, and a pair of dishes 51-52 that are secured to the main body via removable rings 61-62.

Figure 2:
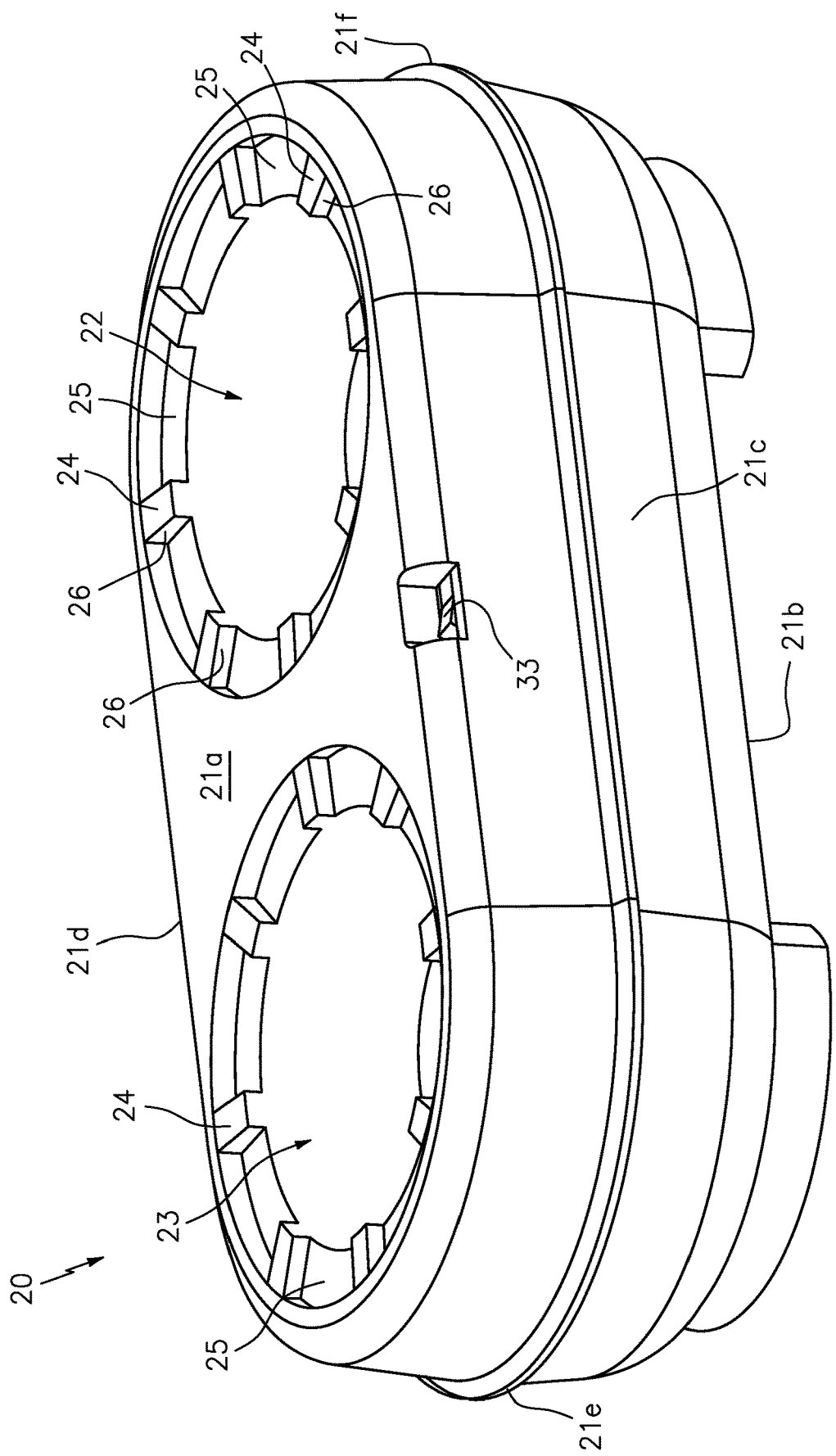
FIG. 2 is a perspective view of the main body of the pet feeding system, in accordance with one embodiment of the invention.

As shown best at FIG. 2, the assembled main body 20 can include a top surface 21a, a bottom surface 21b, a front surface 21c, a back surface 21d and a pair of side surfaces 21e and 21f that define a hollow interior space. In the preferred embodiment, two openings 22 and 23 can be positioned along the top surface 21a, and can function to receive the below described food and water dishes 51 and 52, respectively.

In one embodiment, a plurality of fingers 24 and indentations 25 can be arranged about the periphery of the openings 22 and 23. The top surface of each of the fingers preferably being flush with the top surface of the main body 21a. Likewise, a plurality of slots 26 can be positioned along the periphery of the openings, preferably along one or more of the fingers. Each of the slots 26 and can function to receive and engage the protruding tabs of the below described locking tabs 63, to secure rings 61 and 62 onto the main body.

In various embodiments, the main body 20 may be formed as a single component or may be formed from a plurality of separate body segments (e.g., 20a and 20b) that are joined together along a common side via compression fittings joints or other known manufacturing techniques. In either instance, the main body may be constructed from materials that are, for example, relatively strong and stiff for their weight. Several nonlimiting examples include, but are not limited to various metals or metal alloys (e.g., aluminum, steel, titanium, or alloys thereof), plastic/polymers (e.g., high-density polyethylene (HDPE), rigid polyvinyl chloride (PVC), or polyethylene terephthalate (PET)), and/or various composite materials (e.g., carbon fibers in a polymer matrix, fiberglass, etc.).

Figure 3:
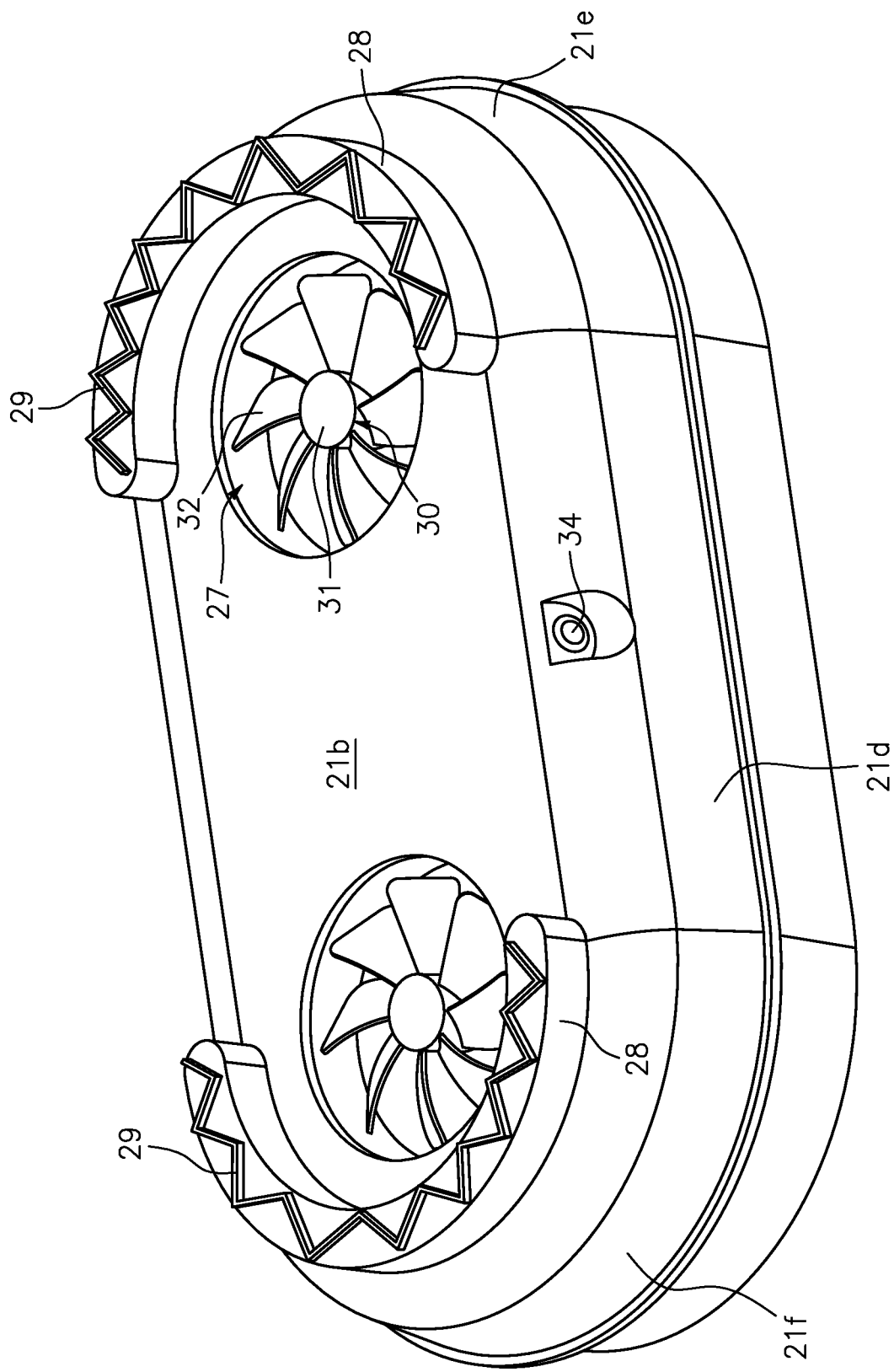
FIG. 3 is a bottom view of the pet feeding system, in accordance with one embodiment of the invention.

As shown best at FIG. 3, a fan 30 can be positioned within or adjacent to a third opening 27 that is positioned along the bottom surface of the main body 21b at a location that is preferably directly beneath opening 22. As described herein, the fan 30 can include, comprise or consist of any number of A/C or D/C operated fans having an electric motor 31 that spins fan blades 32. The fan can be selectively activated by a switch 33 on the main body and can be in electrical communication with a power jack 34 and/or power cord for example, so as to receive power from an electrical outlet. Of course, other embodiments are contemplated wherein the fan 30 can be connected to and powered by an onboard battery (not illustrated).

As is also shown best at FIG. 3, one embodiment of the system can include a pair of feet 28 that extend downward from the bottom surface 21b of the main body. The feet functioning to allow air to be sucked by the fan 30 for use in the manner described below. In the preferred embodiment, each of the feet can include a layer of nonskid material 29 such as rubber, for example, which can prevent excess movement of the system during use.

Figure 4:
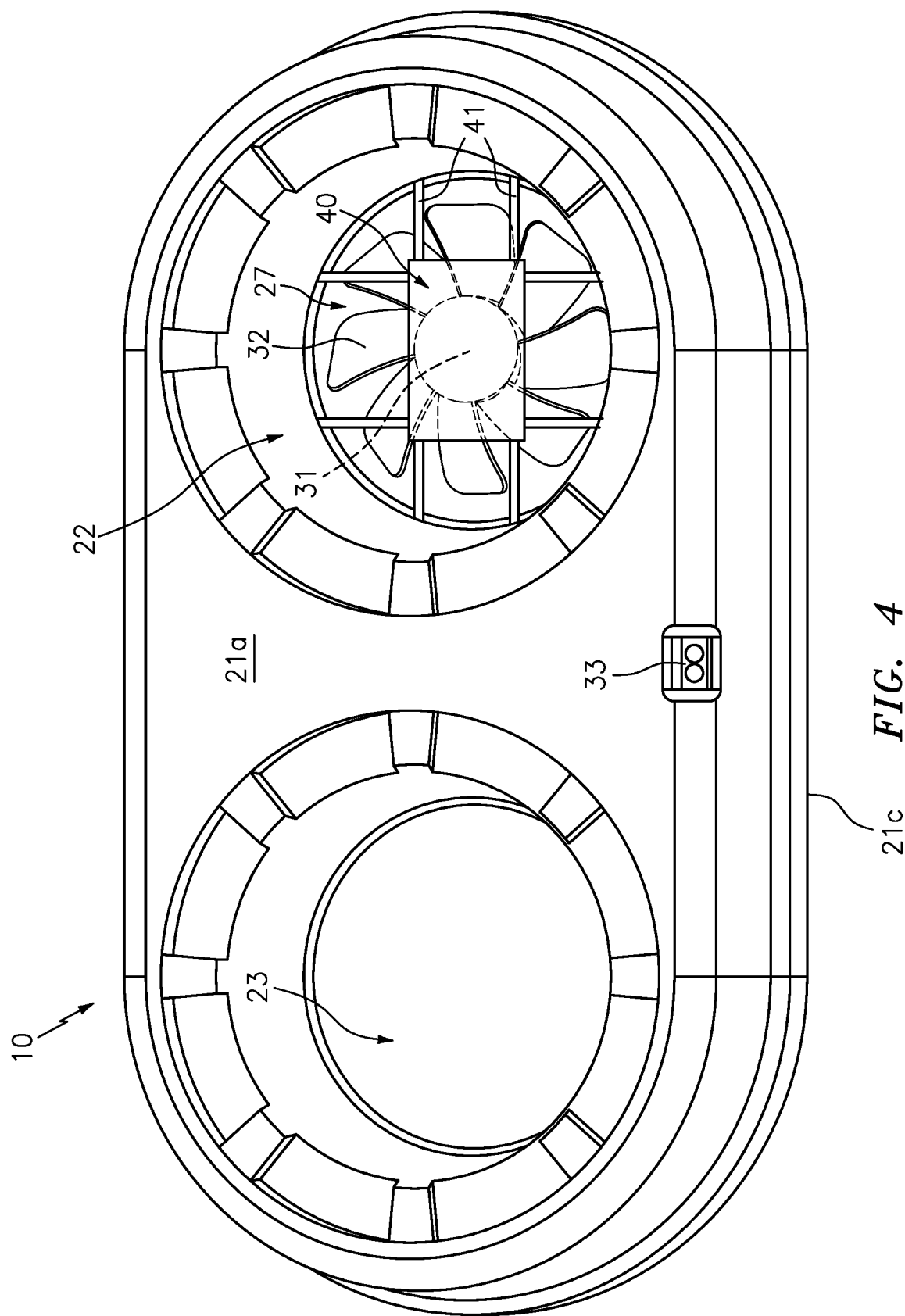
FIG. 4 is a top side view of the pet feeding system, in accordance with one embodiment of the invention.

As shown at FIG. 4, a heat producing device 40 such as the illustrated heat plate, for example, can be positioned in proximity to the fan 30, and can be secured onto the main body via support arms 41 to allow free operation of the fan motor 31 and blades 32. The heating plate can include a generally flat upper surface onto which a tray 45 can be placed. As will be described below, the tray 45 can preferably be constructed from a heat conducting material such as copper or aluminum, for example, can be filled with an aroma producing substance, and can be removably positioned onto the heating plate 40, so as to allow the fan to circulate the aroma into the feeding dish.

As described herein, the heating plate can include any number of devices capable of generating sustained and controlled heat onto the tray 45 in the range of between at least 85° F. and 105° F., for example. One example of a suitable heating plate for use herein includes the model ELE137 PTC heating element that is commercially available from Bolsen Tech, incorporated herein by reference. Of course, any number of other devices are also contemplated. In either instance, the heating plate 40 can be selectively activated by the switch 33 on the main body and can be in electrical communication with the power jack 34 and/or onboard battery.

Figure 5:
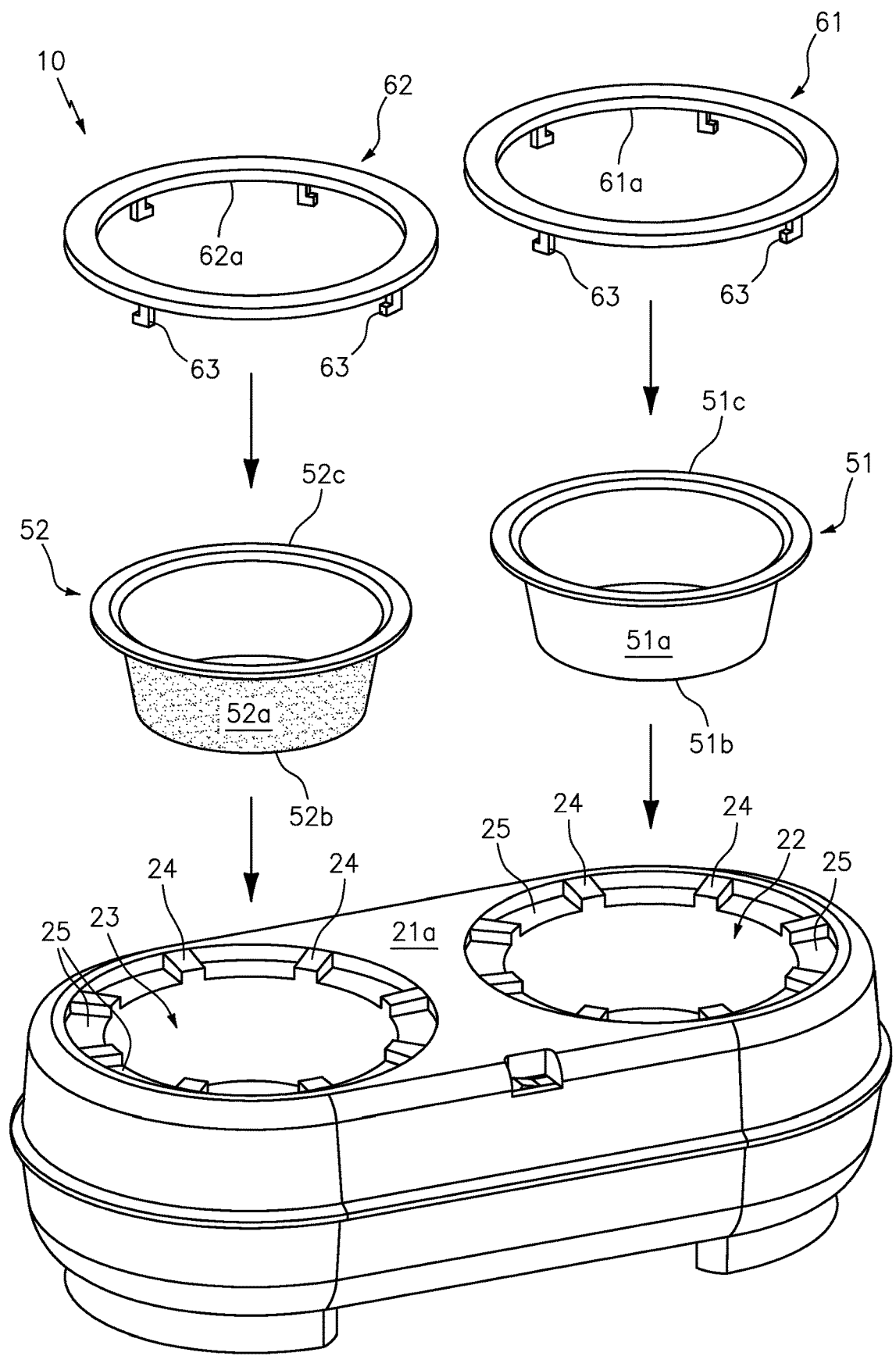
FIG. 5 is an exploded view of the pet feeding system, in accordance with one embodiment of the invention.
Figure 6:
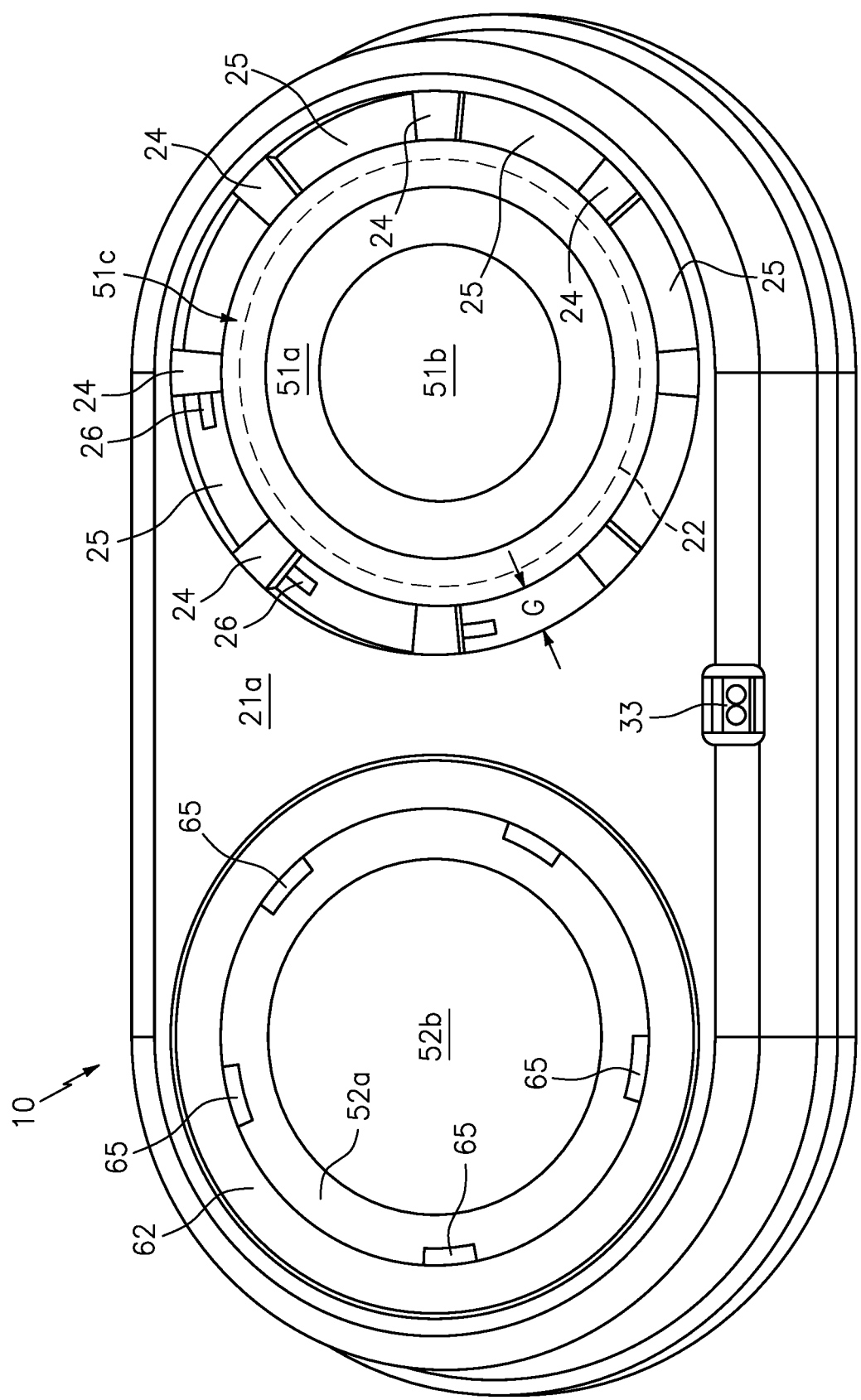
FIG. 6 is another top side view of the pet feeding system, in accordance with one embodiment of the invention.

As shown at FIGS. 5 and 6, one embodiment of the system 10 can include two dishes 51 and 52 into which food and water may be placed. Each of the dishes including a continuous side wall 51a/52a, a closed bottom end 51b/52b and an upper rim 51c/52c, respectively. The side walls of the dishes including a diameter that is less than the diameter of openings 22 and 23 to allow the bowls to be removably placed within the openings.

Moreover, in the preferred embodiment, at least one of the dishes such as dish 52 can be designated as the pet's water dish, and can include an insulative material 53 such as foam, for example, along the bottom and side walls. The insulative material being important for preventing heat supplied by the heating plate 40 from heating water within the dish during use of the plate. Additionally, the insulation being helpful for maintaining the temperature of the water at or below room temperature even when the heating plate is not in use.

As described herein, each of the dishes 51 and 52 may be constructed from any number of suitable materials for use as a pet bowl and for containing liquids such as plastic and various metals, for example. Although described above as including an insulative material along the exterior of one of the dishes, other embodiments are contemplated wherein the dish is constructed to include a double wall design having air or gas between the inner and outer walls to provide the insulative functionality described above.

In one embodiment, a pair of rings 61 and 62 can be provided. Each of the rings including an inside edge 61a/62a having a diameter that is complementary to the outside diameter of the dish rims 51c and 52c, respectively. As shown, a plurality of locking tabs 63 can be disposed along the bottom surface of the rings 61 and 62. The locking tabs can function to engage the plurality of slotted openings described above.

As shown best at FIG. 6, the rims 51c/52c of dishes 51 and 52 include a diameter that is greater than the diameters of the openings 22 and 23, respectively, so as to extend approximately half way along the length of each of the fingers 24. As such, when dishes 51 and 52 are positioned within openings 22 and 23, a gap G remains between the outer edge of the rim and the portion of the main body 21a from which the fingers 24 extend. Such a feature ensuring that a portion of each of the indentations 25 remain partially exposed.

As a result, when the rings 61 and 62 are positioned over the dishes 51 and 52, the distal ends of the locking tabs 63 can engage the slotted openings 26 via a twisting motion to secure the rings in place. When so positioned, air vents 65 can be formed by the fingers 24, indentations 25 and rings 61/62.

Figure 7:
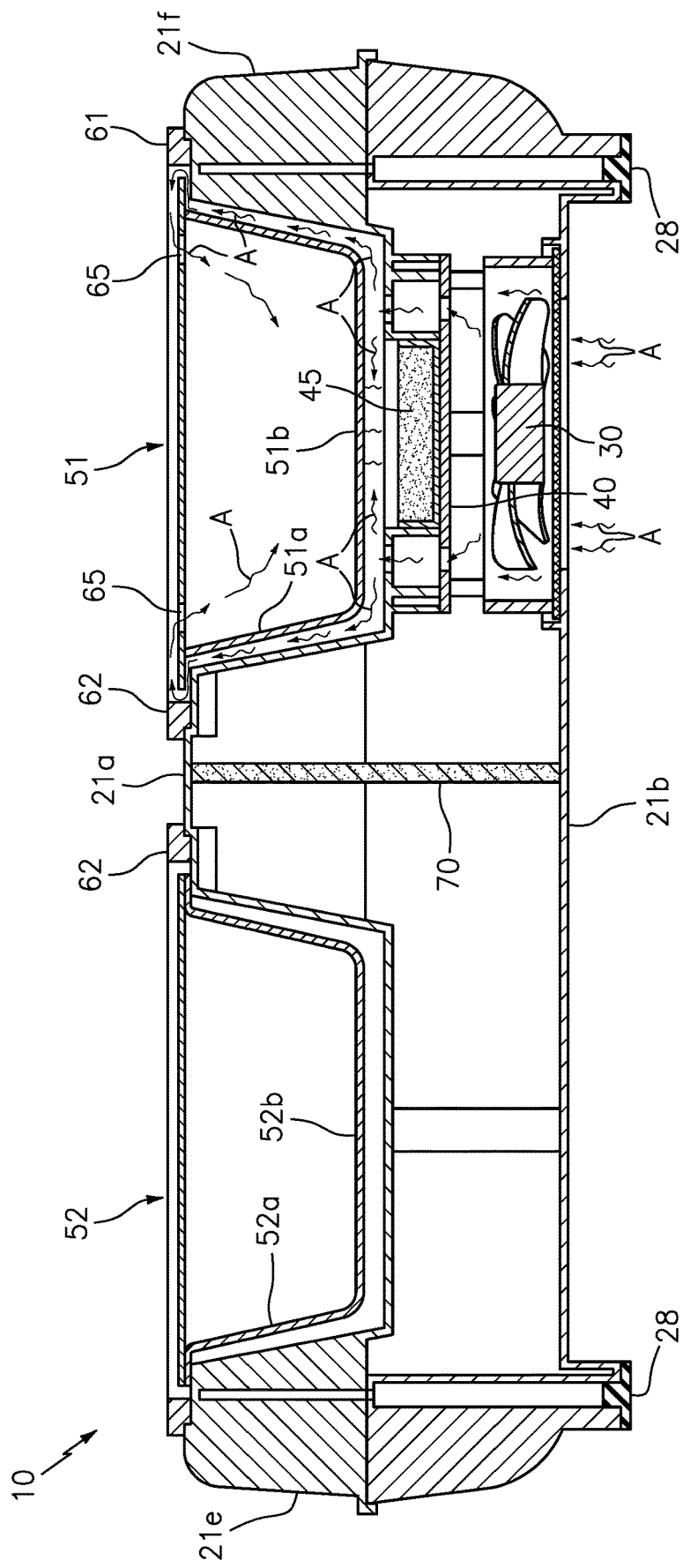
FIG. 7 is a back-side view of the pet feeding system with the back wall removed, in accordance with one embodiment of the invention.

FIG. 7 illustrates one embodiment of the system 10 in operation. As shown, air A can be sucked through the bottom opening 27 by the fan 30. The air can be directed to flow over the heating plate 40 on which the tray 45 containing a scented material such as gravy, meat, and/or other scented materials can reside. The heating plate 40 can impart heat onto the tray 45 which causes the scented material to release its aroma. As the aroma mixes with the air A, it then passes upward along the sides of the dish 51a before escaping through the air vents 65 formed by the fingers, indentations and ring, as described above.

In this regard, the aroma can be directed toward the kibble or other food items contained within the dish and can function to entice the pet to consume the meal. Moreover, because the rings are locked onto the main body, any attempts by the animal to reach the tray containing the scented material will be unsuccessful. Finally, because the tray is removable in nature, pet owners can use a different type of aroma producing material every day.

In the illustrated embodiment, a thermal barrier 70 such as an insulated wall, for example, can be positioned within the main body between openings 22 and 23, and can extend from the top surface 21a to the bottom surface 21b. The thermal barrier functioning to ensure that no aromas and/or heat produced by the system passes into dish 52 which is intended to function as the pets water dish.

Accordingly, the above described pet feeding station with aroma dispensing system 10 provides a novel means for introducing a pleasing aroma onto pet food to entice pets to eat.

Although described above with regard to a station having two dishes, this is for illustrative purposes only, as other embodiments are contemplated wherein the system comprises a single dish or a plurality of dishes, each having the above described functionality for introducing an aroma into a respective dish.

As described herein, one or more elements of the pet feeding station with aroma dispensing system 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the terms "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A pet feeding system, comprising:
    a main body having a top surface, a bottom surface, and a plurality of side surfaces that form a generally hollow interior space;
    a first top opening that is disposed along the top surface of the main body;
    a second top opening that is disposed along the top surface of the main body;
    a first dish that is removably positioned within the first top opening;
    a second dish that is removably positioned within the second top opening;
    a plurality of air vents that are positioned along an upper periphery of the first top opening, each of the air vents being formed by a plurality of fingers and indentations extending from the top surface of the main body toward a center portion of the first top opening; each of the air vents being formed by a plurality of fingers and indentations extending from the top surface of the main body toward a center portion of the first top opening;
    a tray that is removably positioned in line with and directly beneath the first dish,
    a fan that is positioned within the main body at a location directly beneath the tray, said fan functioning to actively push the aroma to each of the plurality of air vents; and
    a bottom opening that is positioned along the main body, said bottom opening being positioned directly beneath the fan,
    wherein the tray is configured to receive a scented material having an aroma that is discharged into the first dish through each of the plurality of air vents.

2. The system of claim 1, further comprising:
    a heating plate that is positioned within the main body, said heating plate including a surface for receiving the tray.

3. The system of claim 2, wherein each of the fan and the heating plate are connected to a control switch located along the main body.

4. The system of claim 2, wherein the heating plate functions to heat the tray to a temperature of between approximately 85 degrees Fahrenheit and 105 degrees Fahrenheit.

5. The system of claim 4, wherein the tray is constructed from a heat conductive material.

6. The system of claim 2, wherein the heating plate is positioned in line with the fan to receive a stream of air that is generated by the fan.

7. The system of claim 2, wherein the heating plate is positioned between the fan and the first dish.

8. The system of claim 2, further comprising:
a thermally insulative wall that is positioned within the main body at a location between the first opening and the second opening, said wall extending from the top surface to the bottom surface and between two of the plurality of side surfaces.

9. The system of claim 1, wherein the second dish includes insulation about a continuous side wall.

10. The system of claim 1, further comprising:
a first locking ring that is positioned along an upper periphery of the first dish, said first locking ring removably securing the first dish within the first top opening; and
a second locking ring that is positioned along an upper periphery of the second dish, said second locking ring removably securing the second dish within the second top opening.

11. The system of claim 10, wherein each of the plurality of air vents are located adjacent to an outer periphery of the first locking ring.

* * * * *